1,609,554

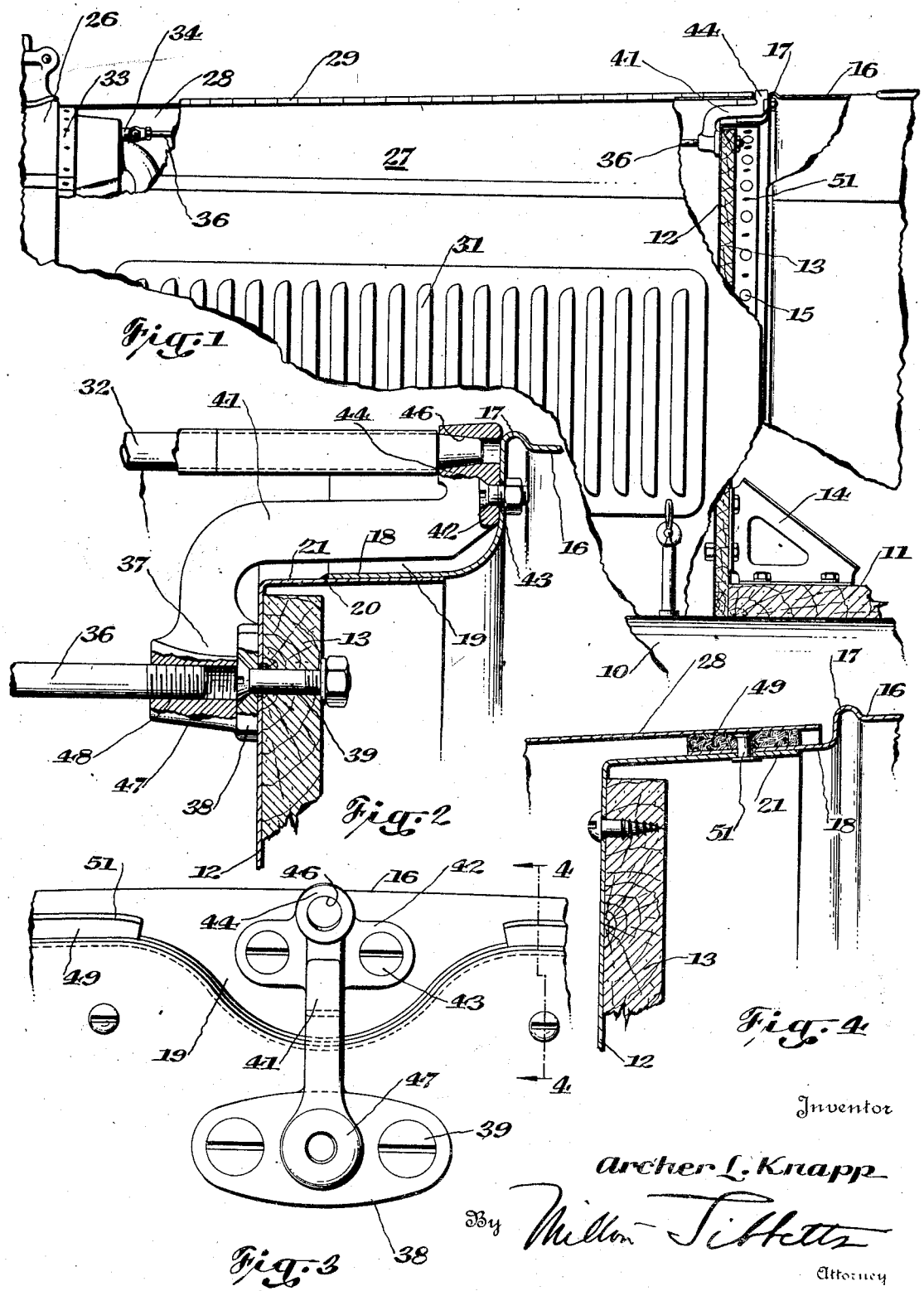
Dec. 7, 1926.
A. L. KNAPP
MOTOR VEHICLE
Filed Nov. 30, 1923
1,609,554
Inventor
Archer L. Knapp
By Milton Tibbetts
Attorney Patented Dec. 7, 1926.

UNITED STATES PATENT OFFICE.

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed November 30, 1923. Serial No. 677,619.

This invention relates to motor vehicles, more particularly to the body construction thereof, and it has for one of its objects to provide a motor vehicle body in which certain parts may be more efficiently and less expensively joined to form a substantially water tight structure.

Another object is to provide a motor vehicle body in which the dash and the cowl members may be more tightly joined than heretofore and in a manner to increase the strength of such joint and to decrease the liability of squeaks and rattles therefrom.

Other objects of the invention will appear from the following description, taken in connection with the drawing which forms a part of this specification, and in which:

Fig. 1 is a view, partially in broken elevation and partially in section, of a portion of a motor vehicle, illustrating the application of the invention;

Fig. 2 is an enlarged sectional detail of a part of the structure shown in Fig. 1;

Fig. 3 is a front elevation of the dash of a motor vehicle, showing the hood supporting bracket, and Fig. 4 is an enlarged section on the line 4—4 of Fig. 3.

Referring to the drawing, at 10 is illustrated a portion of the chassis frame member of a motor vehicle, to which is secured a body sill 11 in any convenient way, as by suitable bolts (not shown). It will be understood that there are two members 10, one at each side of the vehicle, between which, forwardly of the sills 11, is arranged a suitable dash structure. As shown, the dash structure comprises a dash member 12 of sheet metal and a dash liner 13, of wood or other suitable material, but it is to be understood that the dash structure may be constructed in any well known manner. The lower end of the dash structure is secured to the body sills 11 in any convenient way, as by brackets 14, bolted or otherwise secured to the sills 11 and to the dash.

The vehicle is provided with a suitable cowl member 16, preferably formed of pressed sheet metal, which extends rearwardly from the dash and forms the principal enclosure for the front or driving compartment of the vehicle. The cowl 16 may comprise a single sheet of metal, but for convenience in manufacture it is usually formed of three or more sheets, secured together at their edges as by welding. Near its forward edge the cowl 16 is provided with a raised bead 17, extending laterally of the vehicle around the cowl from sill to sill, which is preferably formed by pressing the sheet metal of the cowl during the shaping thereof. In front of the bead 17 the cowl member is depressed to form a forwardly extending flange 18.

The upper edge of the dash 12 is formed with a rearwardly extending flange 21, which is adapted to be overlapped by the cowl flange 18 and which cooperates therewith. The upper surface of the flange 21 is in contact with the lower surface of the flange 18 and the flanges are permanently secured together in any convenient manner, preferably by spot welding, as indicated at 15 in Fig. 1. It will be appreciated that in this way a strong and substantially water tight joint is formed between the cowl and dash flanges, rigidly securing these members together. The flanges 18 and 21 are curved downwardly at the central portion of the upper edge of the dash to form a recess 19, for a purpose which will hereinafter appear, and at the recess portion of the structure the flanges 18 and 21 are continuously welded together to form an absolutely tight joint, as clearly shown at 20 in Fig. 2.

In the forward end of the vehicle is located a radiator 26 through which cooling water for the vehicle engine is circulated in a well known manner. The space between the radiator 26 and the dash 12 constitutes the engine compartment of the vehicle, and is covered by a hood 27. This hood is composed of sheet metal sections 28, suitably joined as by piano hinges 29, so that they may be raised and folded to give access to the engine compartment in a manner well understood in this art. The side members of the hood 27 are preferably provided with louvres 31 for the admission of air. The forward end of the pin 32 which joins the sections of the central hinge 29 is supported in a suitable fixture or bracket (not shown) attached to the radiator 26, and the forward edge of the hood 27 rests, when in closed position, on a ledge 33 formed on the radiator core. The radiator 26 is also provided with a suitable lug 34 to which is attached the forward end of a tension or brace rod 36, by which the radiator is spaced from the dash.

Attached to the dash 12 is a bracket 37, comprising a base portion 38, suitably secured to the dash assembly as by bolts 39, and an upwardly and rearwardly extending arm 41, located in the recess 19 formed by the downwardly curved portion of the flanges 18 and 21. The rear end of the arm 41 has an upturned portion having laterally disposed attaching ears 42, secured to the cowl member 16 forwardly of the bead 17 in any convenient manner, as by bolts 43. Between the ears 42 is a lug 44, provided with a hole 46, which may be slightly tapered, as shown, adapted to receive the rear end of the hinge rod or pin 32. The lower end of the bracket 37 is provided with a boss 47, drilled and threaded as at 48, to receive the threaded end of the brace rod 36. In this manner the bracket 37 may be secured to the forward surface of the dash, while the hinge supporting end of its arm 41 is closely adjacent the cowl bead 17.

The upper surface of the shelf or ledge formed by the welded flanges 18 and 21 is provided with a strip of suitable sound-deadening material 49, such as fabric, secured to the flanges 18 and 21 in any appropriate manner, as by the rivets 51. The rear edge of the hood 27 is adapted to rest on the strip 49 and it will thus be seen that the hood 27 covers the joint between the cowl and the dash. A similar strip of sound-deadening material is arranged on the ledge 33 of the radiator core. The bead 17 forms a lateral deflector for water which falls on the cowl and is shed forwardly thereon, and the fabric strip 49 forms a second channel for the disposition of such water. Because of the overlapping engagement of the flanges 18 and 21 and the close engagement therebetween which is secured by the spot welding, the joint between these members 18 and 21 is extremely tight, so that leakage of water into the inside of the cowl 16 is effectually prevented. This joint is also tight against the entry of wind and dust. An absolutely watertight construction is provided at the recess 19 by the continuous welding 20, so that water which tends to drain into the recess cannot leak into the interior of the cowl.

Furthermore, the continuous welded joint possesses great strength, and as there is no possibility of relative movement between the members, the liability of squeaks and rattles is eliminated.

It will be understood that various forms of the invention other than those described above may be used without departing from the spirit or scope of the invention.

What is claimed is:

1. The combination in a motor vehicle of a cowl member having a raised bead near its forward edge, a depressed portion adjacent the bead forming a forwardly projecting flange, a dash member having a rearwardly disposed flange, and means permanently securing the inner surface of the cowl flange to the outer surface of the dash flange to form a substantially water tight joint.

2. The combination in a motor vehicle of a cowl member having a forward edge depressed to define a continuous flange, said flange being recessed at approximately the mid-point of its length, a dash having a rearwardly projecting flange cooperating with the inner surface of the first named flange and welded thereto, a hinged hood member adapted to overlap the joint between said flanges, and a bracket secured to the dash and extending within said recess adapted to support the rear end of said hood member.

3. The combination in a motor vehicle of a cowl member having a forward edge depressed to define a continuous flange, said flange being recessed at approximately the mid-point of its length, a dash having a rearwardly projecting flange cooperating with the inner surface of the first named flange and permanently joined thereto, a hinged hood member adapted to overlap the joint, a bracket secured to the dash and extending within said recess adapted to receive the rear end of the hinged pin of said hood member, and a brace rod for the dash secured to said bracket below the hood member.

4. In a motor vehicle having a cowl member, a dash, and a hood member, the combination of a forwardly extending flange integral with the cowl and downwardly recessed at its mid-portion, a rearwardly extending flange integral with the dash and permanently joined to the cowl flange, and a bracket secured to the forward surface of the dash and having a rearwardly extending arm disposed in said reccess to support the rear end of the hood above the cowl flange to cover the joint between said flanges.

5. In a motor vehicle having a cowl member and a dash member, the combination of a forwardly extending flange integral with the cowl member and recessed at its mid-portion, and rearwardly extending flange integral with the dash cooperating with cowl flange and permanently joined thereto, said flanges being continuously welded together throughout the length of the recessed portion.

6. In a motor vehicle having a cowl member and a dash member, the combination of a forwardly extending flange integral with the cowl member and recessed at its mid-portion, and a rearwardly extending flange integral with the dash cooperating with the cowl flange and secured thereto at intervals by welding, said flanges being continuously welded together throughout the length of the recessed portion.

7. The combination in a motor vehicle of a cowl member having a depressed forwardly sloping edge, and a dash having an integral flange sloping upwardly and rearwardly in lapping relation with the forward edge of said cowl, said edge and flange being welded together at intervals to form a joint adapted to shed water forwardly of the dash.

In testimony whereof I affix my signature.

ARCHER L. KNAPP.